United States Patent [19]

Deason et al.

[11] Patent Number: 5,349,442
[45] Date of Patent: Sep. 20, 1994

[54] HAND HELD PHASE-SHIFTING DIFFRACTION MOIRE INTERFEROMETER

[75] Inventors: Vance A. Deason; Michael B. Ward, both of Idaho Falls, Id.

[73] Assignee: EG&G Idaho, Inc., Idaho Falls, Id.

[21] Appl. No.: 34,636

[22] Filed: Mar. 18, 1993

Related U.S. Application Data

[63] Continuation of Ser. No. 763,415, Sep. 20, 1991, abandoned.

[51] Int. Cl.$^5$ .............................................. G01B 9/02
[52] U.S. Cl. .................................. 356/354; 356/360; 356/35.5; 250/237 G
[58] Field of Search ............... 356/354, 356, 358, 359, 356/360, 345, 35.5; 250/237 G

[56] References Cited

U.S. PATENT DOCUMENTS

| | | | |
|---|---|---|---|
| 4,153,370 | 5/1979 | Corey | 356/358 |
| 4,322,162 | 3/1982 | McKelvie et al. | 356/35.5 |
| 4,432,239 | 2/1984 | Bykov | 356/35.5 |
| 4,850,693 | 7/1989 | Deason et al. | 356/35.5 |

OTHER PUBLICATIONS

Post, et al., "High Sensitivity Moire Interferometry-A Simplified Approach", Experimental Mechanics, Mar. 1981, pp. 100–104.

*Primary Examiner*—Samuel A. Turner
*Attorney, Agent, or Firm*—Alan D. Kirsch

[57] ABSTRACT

An interferometer in which a coherent beam of light is generated within a remote case and transmitted to a hand held unit tethered to said remote case, said hand held unit having optical elements for directing a pair of mutually coherent collimated laser beams at a diffraction grating. Data from the secondary or diffracted beams are then transmitted to a separate video and data acquisition system for recording and analysis for load induced deformation or for identification purposes. Means are also provided for shifting the phase of one incident beam relative to the other incident beam and being controlled from within said remote case.

15 Claims, 4 Drawing Sheets

HAND HELD PHASE-SHIFTING DIFFRACTION MOIRE INTERFEROMETER

CONTRACTUAL ORIGIN OF THE INVENTION

The United States Government has rights in this invention pursuant to Contract No. DE-AC07-76ID01570 between the U.S. Department of Energy and EG&G Idaho, Inc.

CROSS-REFERENCE TO RELATED APPLICATIONS

This is a continuation of application Ser. No. 07/763,415, filed Sep. 20, 1991 now abandoned.

BACKGROUND OF THE INVENTION

This invention relates to an interferometer and more particularly to a hand held phase shifting diffraction moiré interferometer.

The technique of diffraction interferometry and diffraction grating interferometry, upon which it is based, is directly sensitive to in-plane displacements, provides excellent, variable resolution, and very high quality data. Diffraction moiré interferometry uses a reflective-type diffraction grating (i.e., a specimen grating) which is fixed to an object under study and illuminated by two mutually coherent collimated beams of light at precise incident angles. The specimen grating interacts with each of these beams to generate (diffract) secondary beams which exit the specimen grating. Interference fringes, sometimes called moiré patterns, representing a contour map of in-plane displacements can be observed in the combined secondary beams.

Comparison of fringes before and after loading can be used to determine loading induced displacements. Additionally, the comparison of fringe patterns taken over a period of time can be used for tagging purposes, that is, verifying the identification of the object. (see U.S. Pat. No. 5,003,600, Deason et al.) Analysis of very complex, arbitrary fringe patterns by the conventional fringe tracing techniques is time consuming and difficult to automate. Phase shifting methods, whereby the phase of one incident beam is shifted relative to the other incident beam, greatly reduces the difficulty of analyzing interferograms and provides values at more points on the two dimensional interferogram.

A particular technique for diffraction moiré interferometry is demonstrated by D. Post and W. A. Baracat, "High-sensitivity Moiré Interferometry—A Simplified Approach," Experimental Mechanics, March 1981, pp. 100-104. This technique utilizes a single collimated beam, part of which strikes the specimen at a specific incident angle while the other part of the beam strikes a mirror located perpendicular to the specimen and is then reflected upon the specimen at the same, but opposite incident angle.

Normally, the set-up for diffraction moiré interferometer measurements has been under very controlled laboratory conditions requiring several hours for a very experienced operator to perform. The standard method requires complex and cumbersome optical set-ups, including lasers, spatial filters, collimators, beamsplitters, mirrors and path-matching arrangements. Because of this involved process, diffraction moiré interferometers have been limited in the locations where they could be operated and have required highly trained and experienced operators.

A portable diffraction moiré interferometer exists (see U.S. Pat. No. 4,850,693, Deason et al.) which is compact, portable, convenient to use, and requires little user familiarity with the underlying concepts of diffraction moiré interferometry. This device is approximately the size of a briefcase and weighs about 40 pounds. However, further reductions in size and weight, simplification of data acquisition requirements, and the hand held convenience of the present invention, will enable the additional utilization of diffraction interferometry at locations, and under conditions, previously unsuitable for the portable diffraction moiré interferometer.

It is an object of this invention to provide an apparatus for the measurement of deformed gratings and determination of material distortion or strain in non-laboratory situations.

It is another object of this invention to provide a diffraction moiré interferometer which is hand held, convenient to use, and requires little user familiarity with the underlying concepts of diffraction interferometry.

It is another object of this invention to provide a method for simplification of data acquisition requirements for diffraction moiré interferometry.

Additional objects, advantages and novel features of the invention will become apparent to those skilled in the art upon examination of the following and by practice of the invention.

SUMMARY OF THE INVENTION

To achieve the foregoing and other objects, this invention comprises a novel concept of using diffraction moiré interferometry for tagging or identification purposes, and for long term monitoring of the status of critical welds, piping, structural members, assemblies, surface deformations and other non-destructive testing. The improved interferometer utilizes a hand held unit which generates a pair of mutually coherent collimated laser beams and directs them so that each beam illuminates a diffraction grating at precise, but opposite, incident angles. Means are also provided for shifting the phase of one of the incident beams relative to the other incident beam. The grating interacts with each of these beams to diffract secondary beams which exit the grating perpendicular to the grating's surface. The secondary beams are collected by a lens and imaged by a camera.

The hand held unit is tethered to a remote instrument case and data acquisition computer by fiber optic and electronic cables. Various configurations of the optical and mechanical elements are possible, and the size, weight and shape of the system can be modified to conform to particular requirements.

BRIEF DESCRIPTION OF THE DRAWINGS

The present invention is illustrated in the accompanying drawings where.

electronic cables; a hand held unit; integral and remote video monitors; and a data acquisition unit.

Figure 4:
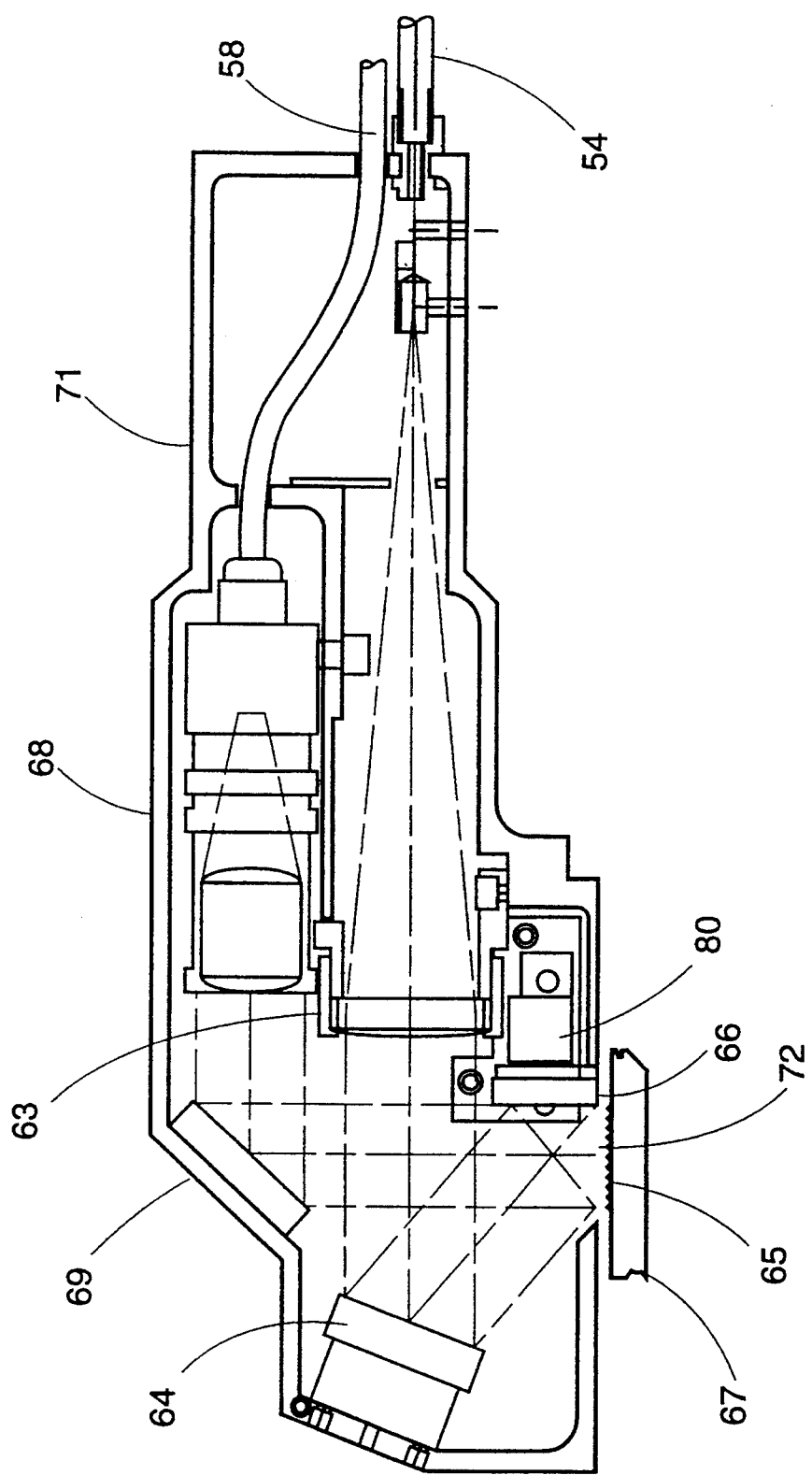

FIG. 4 is a schematic diagram of the hand held unit of the present invention having optical fibers, mirrors, collimating lens, phase shifting means and an imaging device.

DETAILED DESCRIPTION OF THE INVENTION

Figure 1:
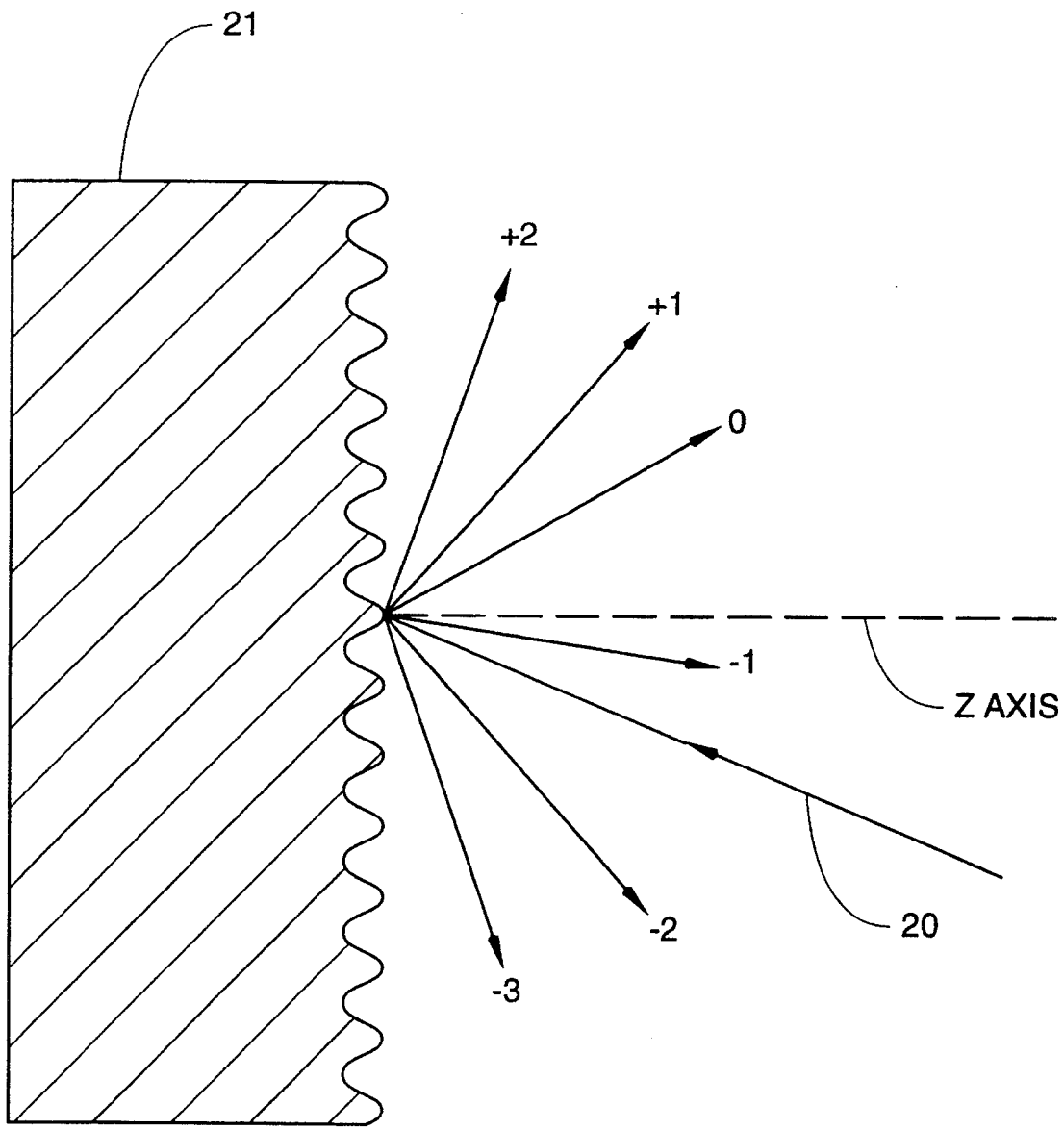
FIG. 1 shows the basic function of a diffraction grating, that is, dividing an incident beam into a number of diffracted beams.

Diffraction moiré interferometry depends upon diffraction of light as well as the interference of light. As illustrated in FIG. 1, a diffraction grating 21 having furrowed or corrugated surfaces, with either symmetrical or nonsymmetrical profiles, is used to diffract light. The diffraction gratings are used to disperse the frequency components in an incident light beam into a spectrum.

In diffraction moiré interferometry, the specimen grating intercepts two beams of coherent light which are incident at symmetrical angle $\pm\alpha$. The exit angle is a function of the beam incident angle and its wavelength. For a laser with a single wavelength of emission, the incident beam 20 is simply redirected by the grating 21 into new beams at fixed angles. The multiple beams generated are called diffraction orders and are numbered in sequence beginning with the zero order, which is the mirror reflection of the incident beam (i.e., the angle of incidence equals the angle of reflection). Diffraction orders whose angles are counter-clockwise with respect to the zero order are considered positive.

Figure 2:
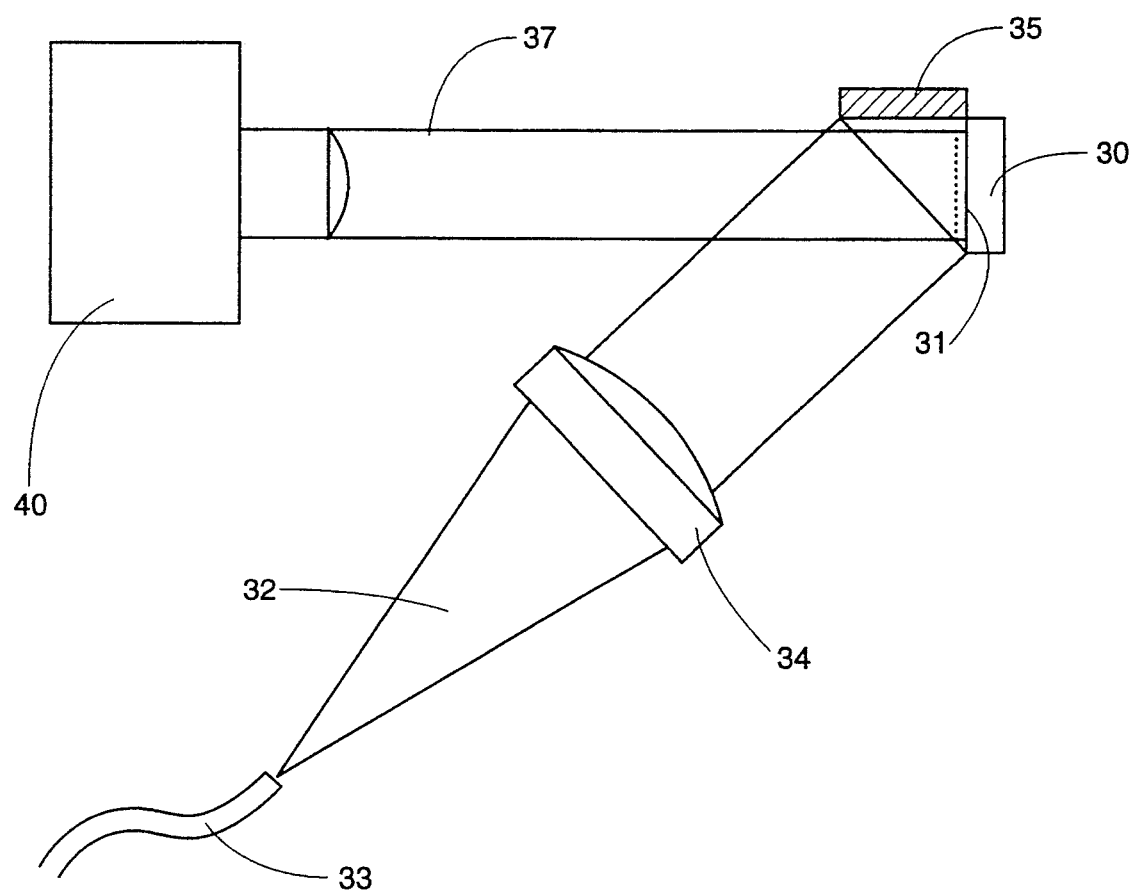
FIG. 2 is a schematic of a diffraction moiré interferometer of the prior art, using the standard elements including a laser, collimating lens, specimen gratings, and mirrors.

As depicted in FIG. 2, a procedure of diffraction moiré interferometry is to replicate an aluminized diffraction grating 31 onto the specimen 30. An incident beam 32, which may be a laser beam, is directed through an optical fiber 33 and upon exiting the optical fiber 33, the laser beam expands from the fiber tip to a collimating lens 34. Part of the collimated incident beam is directed toward a mirror 35 and part of the incident beam is directed toward the specimen 30. Mirror 35 is positioned perpendicular to the specimen 30 so that the incident beam striking the mirror is deflected toward the specimen at the same but opposite incident angle as the incident beam directly striking the specimen. Diffraction by the specimen grating 31 produces output beam 37 having boundaries defined by the first diffraction order. Under a load or deformed condition, a pattern of constructive and destructive interference is formed, which appears to the imaging device 40 as bright and dark fringes.

Figure 3:
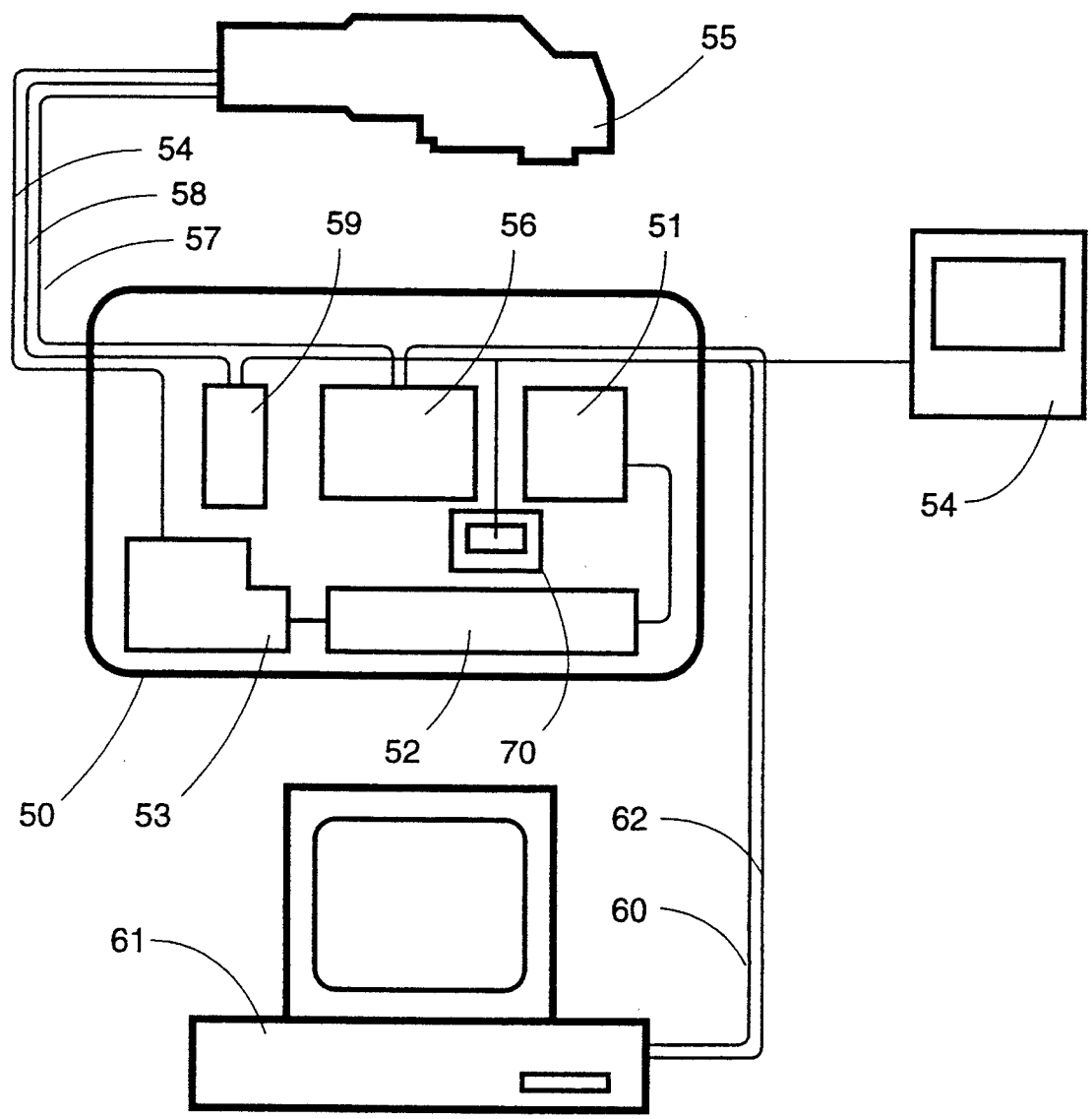
FIG. 3 shows a schematic diagram of the preferred embodiment of the present invention, using a remote instrument case containing a laser, power supply source, and phase shifting control source; fiber optics.

FIG. 3 is a schematic diagram of the preferred embodiment of the present invention, which shows the remote instrument case 50 housing a laser power supply source 51, laser generating source 52, fiber optical coupler 53, video electronics 59, and phase shifting controls 56. In the preferred embodiment of the invention, the remote case is aluminum and is approximately the size of carry-on luggage, and contains an internal frame work which supports the various components. The power supply source 51 can be a 115 volt AC supply or, since most of the components do not require large amounts of power, a portable power supply could be used. Such portable power supply would greatly facilitate the remote field applications of the system.

Within the remote case 50, a laser 52 directs a laser beam to a fiber optic coupler 53 which then directs the beam through an optical fiber cable 54. The optical fiber cable 54 is connected between the remote instrument case 50 and the hand held unit 55. Phase shifting electronic controls 56 are contained within the remote case 50 with an electronic cable 57 carrying the control signals to the hand held unit 55. Images generated from the hand held unit are transmitted through a video cable 58 to the remotely located video circuits 59 and then sent by video cable 60 to a video monitor 70 and to recording equipment and computerized controls 61. In the preferred embodiment, the video monitor 70 is contained in the remote instrument case 50, but it is also possible for the monitor to be external to the remote case, as depicted in FIG. 3 by optional external monitor 70a. Control cable 62 provides timing synchronization between phase shift control 56 and computer control 61. As a result of the remote location of the laser and other control systems, the hand held unit is compact and weighs only about one kilogram. This permits the system to be operated under conditions and in locations that previously were not susceptible or accessible for tagging or deformation testing using diffraction moiré interferometry.

FIG. 4 illustrates the operation of the hand held unit 55 of FIG. 3. As depicted in FIG. 4, the optical design in the hand held unit 55 is compact with the laser beam being conducted from the remote instrument case through the optical cable 54 to the hand held unit 55. A small integral laser diode could be installed in the hand held unit if desired, but experience has shown that the savings of space and weight may be illusory. The laser beam freely expands from the fiber tip to a collimating lens 63. Some savings in length could be made by introducing a negative lens in the beam to increase the beam divergence angle. The collimated beam is about 35 mm in diameter and is directed by a mirror 64 toward the specimen grating 65 and a second mirror 66 at a precise angle described by the grating equation:

$$\sin \Theta = F\lambda$$

where, $\Theta$ is the angle between the beam and the perpendicular to the grating;

F is the number of grooves per millimeter on the grating; and $\lambda$ is the wavelength of the laser beam in millimeters.

Part of the collimated incident beam is directed toward a mirror 66 and part of the incident beam is directed toward the specimen 67 and specimen grating 65. Mirror 66 is positioned perpendicular to the specimen 67 so that the incident beam striking the mirror is deflected toward the specimen at the same but opposite incident angle as the incident beam directly striking the specimen 67. The incident laser beams exit the hand held unit housing 71 through a viewing port 72 which is manually aligned with the specimen 67 and specimen grating 65 by the operator. This beam forming configuration simplifies the optical system and provides a compact design for the hand held unit, thereby increasing the flexibility and maneuverability of the unit. The laser must be somewhat more coherent to compensate for the difference in path length of the two beams striking the specimen. Good transverse beam uniformity and a larger beam size are also required compared to the normal independent dual beam interferometer. However, such dual independent beam formation is compatible with the compact form of the hand held unit and is a potential configuration for such units. This later configuration could be realized by using an evanescent wave beam splitter, contained within the remote case, to divide the coherent beam into at least two mutually coherent beams and conveying each beam independently in separate optical fibers. Phase shifting techniques could also be utilized in this configuration.

The two beams are diffracted by specimen grating 65 in a direction perpendicular to the specimen toward an imaging device 68 mounted in the unit. In the preferred embodiment, the diffracted beams are reflected by mirror 69 to the imaging device 68, however, it is possible for the imaging device to be positioned directly above the specimen location, thereby eliminating the necessity of mirror 69. However, this configuration may negatively effect the compact design of the hand held unit. As shown in FIG. 3, the deformation data contained in the diffracted beams is transmitted to a separate laptop or other microcomputer 61 which provides data digitization, storage, retrieval, reduction and display capabilities.

A process of data collection and reduction known as phase shifting or phase stepping is incorporated into the system. This results in the removal of most of the optical "noise" from the data so that accurate interpolations in the data can be made. Phase shifting results in improvements in resolutions of phase of about 100 times, a simplification of data reduction and improvement of data availability.

Phase shifting requires that the optical phase of one of the incident beams be shifted relative to the other. This is usually done by changing the optical path of one beam by a small amount (less than a micrometer) in three or more steps. A video image of the data is collected after each change. Phase shifting algorithms are then used to evaluate the data and compute accurate phase and deformation maps of the grating and the underlying material.

As shown in FIG. 4, in the present invention, the phase is shifted by moving mirror 66 forward and backward while maintaining the mirror's perpendicular relationship to the specimen. This changes the optical path length travelled by the part of the collimated incident beam that strikes the mirror and therefore, changes its phase relative to the phase of the other incident beam that strikes the specimen directly. In the preferred embodiment, mirror 66 is moved by means of a piezoelectric driver 80 which is controlled by the electronic phase shifting controls 56 located in the remote case. A signal from the phase shifting controls to the data collection computer via cable 62 synchronizes the phase shifting and video digitizing operations.

The operation of the present invention is straightforward requiring little operator training or knowledge of diffraction moiré interferometry. The operator places the hand held unit in contact and in alignment with the specimen and specimen diffraction grating and then activates the system to begin data collection. A series of phase shifted interferograms is automatically acquired and processed to produce quantitative data on deformations. Data collection requires a fraction of a second. Once the data is acquired, data reduction by a small, portable microcomputer using previously developed algorithms analyzes the data to determine or loading characteristics on the specimen. An analogous procedure can be used to record and later read and verify a grating tag.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical application and enable others skilled in the art to utilize the invention in various embodiments and with various modifications as are suited to the particular use contemplated. It is intended that the scope of the invention be defined by the claims appended hereto.

The embodiments of this invention in which an exclusive property or privilege is claimed are defined as follows:

1. A method of determining in-plane surface deformations of an object on the basis of diffraction of rays by a diffraction grating replicated onto the surface of said object, the steps comprising:
   providing from a source a beam of coherent light;
   coupling said beam to a polarization maintaining, single mode optical fiber;
   transmitting said beam of coherent light through said single mode optical fiber to a remote hand held unit;
   positioning said hand held unit over the diffraction grating replicated onto the surface of said object;
   controlling and directing said beam of coherent light within said hand held unit by separate paths onto said diffraction gratings at opposite, but equal, incident angles; and
   viewing, identifying and recording interference patterns created by diffraction of said coherent beams as a result of deviations in said diffraction grating.

2. A method of determining in-plane deformation of an object on the basis of diffraction of rays by a diffraction grating replicated onto the surface of said object, the steps comprising:
   providing from a source a beam of coherent light;
   coupling said beam to a polarization maintaining, single mode optical fiber;
   transmitting said beam of coherent light through said single mode optical fiber to a remote hand held unit;
   collimating within said hand held unit the transmitted coherent beam of light;
   aligning said collimated beam of light with the diffraction grating by positioning said hand held unit over the diffraction grating;
   reflecting the collimated beam off a first mirror so that a first portion of the collimated beam is directed toward the diffraction grating at an oblique incident angle and a second portion of the collimated beam is directed toward a second mirror within said hand held unit;
   reflecting said second portion of the collimated beam off the second mirror so that the second collimated beam is directed toward the diffraction grating at an oblique incident angle that is equal to but opposite said first collimated beam incident angle;
   imaging, identifying and recording interference patterns created by diffraction of said beams as a result of deviation in said diffraction grating.

3. The method of claim 2 further comprising the step of shifting the phase of the second collimated beam relative to the first collimated beam and recording a series of interference patterns.

4. The method of claim 3 wherein the phase of the second collimated beam is shifted relative to the first collimated beam by moving the second mirror within the hand held unit.

5. The method of claim 2 wherein the imaging of the interference pattern is by a video monitor attached to said hand held unit by electronic cable.

6. The method of claim 2 wherein the recording of the interference pattern is by a computer attached to said hand held unit by electronic cable.

7. A hand held interferometer system for performing the method of diffraction moiré, comprising:

a case; means for creating a beam of coherent light, said means contained within the case, coupling means for coupling said beam of coherent light to a polarization maintaining, single mode optical fiber within an optical fiber, said coupling means contained within the case;

a remote hand held unit tethered to said case by said optical fiber;

optical means within said remote hand held unit for directing and aligning said coherent beam through separate paths at a diffraction grating replicated onto the surface of a test specimen, said separate coherent beam paths having opposite but equal incident angles to the test specimen;

observation means for viewing and measuring interference patterns created by the diffraction of said beams by said diffraction grating; and recording means for permanently registering said measured interference pattern data.

8. The interferometer system of claim 7 wherein the means for creating the beam of coherent light is a laser.

9. The interferometer system of claim 7 further comprising phase shifting control means for controlling said optical means, said phase shifting control means being contained within said case and connected to said remote hand held unit by an electronic control cable.

10. The interferometer system of claim 7 further comprising phase shifting means for shifting the phase of one coherent beams relative to the other coherent beams.

11. The interferometer system of claim 7 further comprising beamsplitting means within the case for splitting said beam of coherent light into at least two mutual beams of coherent light and coupling means for coupling said mutual beams of coherent light into separate polarization maintaining, single mode optical fibers tethering said remote hand held unit to the case.

12. The interferometer system of claim 7 wherein said observation means is a video monitor contained within said case.

13. The interferometer system of claim 7 wherein said observation means is a video monitor located external to said case.

14. The interferometer system of claim 7 wherein said recording means is a portable computer.

15. The interferometer system of claim 7 wherein a piezoelectric driver contained within said hand held unit is used to adjust said optical means within the remote hand held unit, said piezoelectric drive being controlled by control means contained within said case.

* * * * *